United States Patent [19]
Ma

[11] Patent Number: 5,994,882
[45] Date of Patent: Nov. 30, 1999

[54] SYNCHRONOUS RECTIFIER FOR BOOST CONVERTERS

[75] Inventor: Bing Fong Ma, Sunnyvale, Calif.

[73] Assignee: Linear Technology Corporation, Milpitas, Calif.

[21] Appl. No.: 09/185,144

[22] Filed: Nov. 3, 1998

[51] Int. Cl.[6] .................................................... G05F 1/10
[52] U.S. Cl. .......................................... 323/222; 323/224
[58] Field of Search ................................... 323/222, 224, 323/282; 363/89

[56] References Cited

U.S. PATENT DOCUMENTS 5,572,417   11/1996   Vinciarelli et al. ........................ 363/89

OTHER PUBLICATIONS

"LT1300 Micropower High Efficiency 3.3/5V Step–Up DC/DC Converter" (data sheet), *1994 Linear Databook, vol. III*, pp. 4–478 to 4–485, Linear Technology Corporation, Milpitas, CA (1994).

"LT1305 Micropower High Power DC/DC Converter with Low–Battery Detector" (data sheet), *1995 Linear Databook, vol. IV*, pp. 4–290 to 4–297, Linear Technology Corporation, Milpitas, CA (1995).

"LT1307 Single Cell Micropower 600kHz PWM DC/DC Converter" (data sheet), *1996 Linear Databook, vol. V*, pp. 4–160 to 4–173, Linear Technology Corporation, Milpitas, CA (Jul. 1996).

"MAX877L/MAX878L/MAX879L Step–Up/Step–Down DC–DC Converters" (date sheet), pp. 1–12, Maxim Integrated Products, Sunnyvale, CA (Jul. 1996).

"ML4875 Low Voltage Boost Regulator with Shutdown" (data sheet), pp. 1–10, Micro Linear Corporation, San Jose, CA (Jul. 1996).

"UCC3941–3/–5/–ADJ 1V Synchronous Boost Converter" (data sheet), pp. 1–9, Unitrode Corporation, Merrimack, NH (Mar. 1997).

*Primary Examiner*—Shawn Riley
*Attorney, Agent, or Firm*—Fish & Neave; Robert W. Morris; Garry J. Tuma

[57] ABSTRACT

A boost DC-DC converter with a synchronous composite rectifier is presented. The boost DC-DC converter limits inductive in-rush current, includes a shutdown mode, operates also in step-down mode, and can be fabricated using conventional bipolar processes. The composite rectifier includes a power NPN transistor and a lateral PNP transistor. During converter start-up and in step-down mode (when the output voltage is less than the input voltage), the lateral PNP transistor drives the power NPN transistor. The lateral PNP transistor is biased such that inductive volt-second balance can be maintained, limiting in-rush current. In boost mode (when the output voltage is higher than the input voltage), the lateral PNP transistor is disabled and the power transistor is driven into saturation. Again, inductive volt-second balance can be maintained.

18 Claims, 9 Drawing Sheets

5,994,882

SYNCHRONOUS RECTIFIER FOR BOOST CONVERTERS

BACKGROUND OF THE INVENTION

This invention relates to rectifier for boost DC-DC converters. More particularly, this invention relates to synchronous rectifiers for boost DC-DC converters that can be fabricated in conventional bipolar processes.

A boost DC-DC converter generates a output voltage higher than its input voltage. Conventional boost DC-DC converters (also known as regulators) typically employ an inductive energy storage lement (e.g., an inductor) coupled in series with a "free-wheeling" diode rectifier. The diode rectifier conducts current only in the direction of the load, and is considered free-wheeling because its operation cannot be controlled independent of the voltages at its anode and cathode (i.e., conduction occurs when voltage at the anode exceeds voltage at the cathode by the turn-on voltage, which is typically 0.3 to 0.7 volts).

Boost DC-DC converters typically include a switch that provides a current path to ground from a node formed between the inductive energy storage element and the diode rectifier. Control circuitry regulates the duty cycle of the switch (i.e., the percentage of time the switch is ON during a cycle of operation). The duty cycle controls the amount of energy delivered to the load.

FIG. 1 shows a known conventional boost DC-DC converter, which can be fabricated in a conventional bipolar process. Such a process produces high performance NPN transistors that have high current gain and good current-carrying capabilities. Furt lermore, lateral and substrate PNP transistors can also be fabricated without additional processing steps (although they are generally slower than NPN transistors and have limited current-carrying capabilities). In contrast, other known boost converters (three of which are described belo ) are fabricated in BICMOS or complementary bipolar processes. These processes require additional processing steps, and are thus more complex and typically more costly than conventional bipolar processes.

Converter 100 includes inductor 102, power NPN transistor switch 104, and diode rectifier 10. The duty cycle of switch 104 is controlled by switch control circuitry 108. During switch 104 ON-time (i.e., when switch 104 is conducting), current flows from input voltage source VIN through inductor 102 and switch 104 to ground. The voltage across inductor 102 is positive ($V_L \approx V_{IN} > 0$). This positive voltage causes magnetic flux in inductor 102 to increase. Because magnetic flux is proportional to inductor current, inductor current increases when magnetic flux increases.

During switch 104 OFF-time (i.e., when switch 104 is non-conducting), current flows from $V_{IN}$ through inductor 102 and diode 106 to output 120. At steady-state (i.e., during normal boost operation, also known as step-up mode), output voltage VOUT is higher than $V_{IN}$. The voltage across inductor 102 is therefore negative ($V_L = V_{IN} - V_{DIODE} - V_{OUT} < 0$, where $V_{DIODE}$ is the voltage drop across diode 106). This negative voltage causes magnetic flux in inductor 102 to decrease. Accordingly, inductor current decreases. Preferably, the duty cycle of switch 104 is set such that flux increases during ON-time equal flux decreases during OFF-time. The net DC flux in inductor 102 is therefore zero, permitting inductor 102 to establish volt-second balance (i.e., equilibrium).

A disadvantage of converter 100 occurs during converter start-up when the output voltage rises from zero to its steady-state value. During switch 104 ON-time, inductor voltage is positive and magnetic flux increases as in steady-state. But, during switch 104 OFF-time, inductor voltage remains positive ($V_L = V_{IN} - V_{DIODE} - V_{OUT} > 0$) while $V_{OUT}$ is less than $V_{IN}$ by at least $V_{DIODE}$. Inductor flux therefore continues to increase. Moreover, because the output bypass capacitance (represented by capacitor 106) is typically high (e.g., 100–200 $\mu$F), the rising output voltage transient is slow. Inductor current therefore continues to increase until capacitor 160 is charged to $V_{IN} - V_{DIODE}$. This results in high "in-rush" current from inductor 102.

High in-rush current causes excessive power dissipation in switch 104 and diode 106, and can damage some types of batteries commonly used as $V_{IN}$ by exceeding their maximum current rating. Furthermore, high in-rush current cannot be prevented by modifying the duty cycle of switch 104, because inductor voltage is positive during both switch 104 ON-time and OFF-time, rendering ineffective any duty cycle modifications.

Another disadvantage of converter 100 is that the output cannot be electrically isolated from the input (i.e., converter 100 does not have a shutdown mode). Current can always flow from input 124 through inductor 102 and diode 106 to output 120. Converter 100 would need an extra switch coupled in series with inductor 102 and diode 106 to effectively disconnect the output from the input. A shutdown mode isolates the load during converter shutdown to prevent unnecessary power dissipation.

FIG. 2 shows a known boost DC-DC converter with a PMOS synchronous rectifier. A synchronous rectifier is a controllable switch that replaces the rectifying diode. The synchronous rectifier turns ON substantially immediately after the switch turns OFF. Converter 200 includes inductor 202, power NMOS transistor switch 204, which is driven by switch control circuitry 208, PMOS transistor synchronous rectifier 206, which is driven by rectifier control circuitry 218, and PMOS shutdown transistor 214, which is driven by shutdown control circuitry 216. Diodes 210 and 212 represent parasitic body diodes of PMOS rectifier 20. Converter 200 may be, for example, the ML4875 of Micro Linear Corporation, of San Jose, Calif.

Unlike converter 100, converter 200 includes a shutdown mode. When converter 200 receives a shutdown signal, shutdown control circuitry 216 causes switch control circuitry 208 and rectifier control circuitry 218 to respectively turn OFF switch 204 and rectifier 206 (inputs to switch control circuitry 208 and rectifier control circuitry 218 are not shown in FIG. 2 for clarity). Shutdown control circuitry 216 also turns OFF transistor 214, which is ON during normal boost operation. With rectifier 206 and transistor 214 both OFF, a current path from inductor 202 to output 220 no longer exists. Output 220 is thus effectively disconnected from input 224. Output voltage $V_{OUT}$ then decreases as output capacitor 260 discharges through a load (not shown) coupled to output 220.

Because of efficiency concerns, switch 204 and rectifier 206 are preferably not ON simultaneously. During the interval between switch 204 turning OFF and rectifier 206 turning ON, inductor current is carried by free-wheeling diode 210 and transistor 214 (which shorts diode 212). Transistor 214 therefore carries as much current as switch 204 and rectifier 206, and is accordingly as large. Thus, by implementing a shutdown mode with a separate shutdown transistor, additional circuit die space is required to implement converter 200.

In normal boost mode, converter 200 operates similarly to converter 100. During switch 204 ON-time, rectifier 206 is OFF and voltage across inductor 202 is positive. During switch 204 OFF-time, rectifier 206 is ON, delivering inductor current to output 220, and voltage across inductor 202 is negative. Inductor 202 can therefore establish volt-second balance.

However, during converter start-up, converter 200 has the same disadvantage as converter 100—converter 200 cannot prevent the development of high in-rush current. While $V_{OUT}$ is less than $V_{IN}$ by at least the voltage drop across diode 210, inductor voltage remains positive during switch 204 OFF-time regardless of the bias on the gate of PMOS rectifier 206, because diode 210 and transistor 214 provide a parallel current path to output 220. Inductor 202 therefore cannot establish volt-second balance, which can result in high in-rush current.

Another disadvantage of converter 200 is that it is typically fabricated in a BICMOS process in which PMOS transistors are fabricated in an N-epitaxial layer and NMOS transistors are fabricated in P-wells tied to the P-substrate. Such BICMOS processes are more complex and typically more costly than conventional bipolar or conventional CMOS processes. In particular, for example, converter 200 requires an N-buried layer under PMOS transistor 214 to limit substrate current through diode 210. Conventional CMOS processes typically do not have buried layers. In the absence of an N-buried layer, conduction by diode 210, which occurs during the interval after switch 204 turns OFF and before PMOS rectifier 206 turns ON, results in current flow into the substrate. If diode 210 current is high, substrate current will be substantial. This can result in the unintentional forward biasing of P-substrate and N-epitaxial layer junctions, which will adversely affect the operation of converter 200. Thus, converter 200 cannot likely be fabricated in a conventional process.

FIG. 3 shows a known boost/step-down DC-DC converter with a power PNP synchronous rectifier. Converter 300 controls in-rush current, includes a shutdown mode, and also operates in step-down mode (i.e., the steady-state output voltage is less than the input voltage). Converter 300 includes inductor 302, NPN transistor switch 304, and PNP transistor synchronous rectifier 306. Switch control circuitry 308 drives switch 304 and rectifier control circuitry 318 drives rectifier 306. Such a converter may be, for example, a MAX877L/878L/879L boost/step-down regulator of Maxim Integrated Products, of Sunnyvale, Calif.

Converter 300 limits the development of high in-rush current. During switch 304 ON-time, voltage across inductor 302 is positive ($V_L=V_{IN}>0$). During switch 304 OFF-time, the base of PNP rectifier 306 is driven by rectifier control circuitry 318 such that the voltage at node 322 ($V_{322}V_{EB306}+V_{BASE306}$) is higher than $V_{IN}$, regardless of the output voltage. The voltage across inductor 302 is therefore negative while PNP rectifier 306 delivers inductor current to output 320, which is coupled to a load (not shown). Inductor 302 can thus establish volt-second balance, limiting the development of high in-rush current.

In shutdown mode, rectifier control circuitry 318 turns PNP transistor 306 OFF, effectively disconnecting output 320 from input 324. Output voltage $V_{OUT}$ then decreases as output capacitor 360 discharges through the load.

Converter 300 however is typically fabricated in a complementary bipolar process. Although such processes produce vertical PNP transistors that have performance and current-carrying capabilities comparable to those of NPN transistors, complementary bipolar processes are more complex and typically more costly than conventional bipolar processes. Moreover, converter 300 cannot easily be fabricated in a conventional bipolar process. For example, PNP transistor 306, which carries a substantial amount of inductor current, would have to be fabricated as an excessively large lateral PNP transistor to carry the same amount of inductor current. Such a large PNP transistor would require additional circuit die space, which is typically limited and costly in most converter designs.

FIG. 4 shows a known boost DC-DC converter with an NMOS synchronous rectifier. Converter 400 includes a shutdown mode and an auxiliary boost output, and is typically fabricated in a BICMOS process. Converter 400 includes inductor 402, NMOS transistor synchronous rectifier 406, NMOS transistor switch 404 auxiliary boost output VGD, and variable frequency control circuitry 418. Diodes 410 and 412 represent the parasitic body diodes of rectifier 406. Converter 400 may be, for example, a UCC3941 boost converter of Unitrode Corporation, of Merrimack, N.H.

Converter 400 operates efficiently when the gate drive voltage of NMOS rectifier 406 is higher than $V_{OUT}$ by about 1–2 volts. The gate drive voltage is supplied by auxiliary boost output $V_{GD}$, which typically has a maximum voltage of about 8 volts. The power transfer from input 424 is multiplexed between $V_{OUT}$ and $V_{GD}$. Before $V_{GD}$ reaches 7.5 volts, rectifier 406 remains OFF and converter 400 supplies $V_{GD}$. Once $V_{GD}$ increases above 7.5 volts, $V_{OUT}$ has priority in the multiplexing scheme. In shutdown mode, rectifier 406 is turned OFF and body diode 410 blocks current flow from input 424 to output 420, effectively disconnecting input 424 from output 420.

A disadvantage of converter 400 is that the gate threshold voltage of rectifier 406 increases as its source voltage increases. This is known as the body effect. It results from the reverse-bias between the source of rectifier 406 (which is coupled to output 420) and its body at node 411. If node 411 could be tied to output 420, the body effect can be eliminated. Such a connection however is not likely in this BICMOS process. Therefore, because the source of rectifier 406 is coupled to output 420, the gate threshold voltage of rectifier 406 increases when $V_{OUT}$ increases. Thus, if $V_{OUT}$ causes the gate threshold voltage to increase to a level where $V_{GD}$ can no longer supply a gate drive voltage of about 1–2 volts above $V_{OUT}$, the efficiency of converter 400 decreases.

Another disadvantage of converter 400 occurs during converter start-up if rectifier 406 is driven into the triode region (also known as the ohmic or nonsaturation region), where $V_{DS}$ is low. Low $V_{DS}$ results in positive inductor voltage while $V_{OUT}$ is less than $V_{IN}$, preventing inductor 402 from establishing volt-second balance. This can result in high in-rush current.

In view of the foregoing, it would be desirable to be able to provide a boost DC-DC converter that limits inductive in-rush current.

It would also be desirable to be able to provide a boost DC-DC converter that includes a shutdown mode.

It would further be desirable to be able to provide a boost DC-DC converter that also operates in step-down mode.

It would still further be desirable to be able to provide a boost DC-DC converter that can be fabricated in a conventional bipolar process.

SUMMARY OF THE INVENTION

It is an object of this invention to provide a boost DC-DC converter that limits inductive in-rush current.

It is also an object of this invention to provide a boost DC-DC converter that includes a shutdown mode.

It is further an object of this invention to provide a boost DC-DC converter that also operates in step-down mode.

It is still further an object of this invention to provide a boost DC-DC converter that can be fabricated in a conventional bipolar process.

In accordance with this invention, a boost DC-DC converter circuit is provided that includes an input terminal for coupling to a voltage source, an inductive energy storage element coupled to the input terminal, a composite rectifier coupled to the inductive storage element, a switch coupled between ground and a node formed between the inductive storage element and the composite rectifier, control circuitry coupled to the switch, driver circuitry coupled to the composite rectifier, and an output terminal coupled to the composite rectifier for coupling to a load. The composite rectifier includes at least two opposite polarity transistors.

Further in accordance with this invention, the boost DC-DC converter circuit can be fabricated using conventional bipolar processes. Moreover, the boost DC-DC converter circuit limits inductive in-rush current, includes a shutdown mode, and operates also in step-down mode (i.e., when steady-state voltage at the output terminal is less than voltage at the input terminal).

Preferably, the composite rectifier includes a power NPN transistor and a lateral PNP transistor coupled as follows: the collector of the power NPN transistor is coupled to the inductive storage element, the emitter of the power NPN transistor is coupled to the output terminal, and the base of the power NPN transistor is coupled to the driver circuitry. The emitter of the lateral PNP transistor is coupled to the collector of the power NPN transistor, the collector of the lateral PNP transistor is coupled to the base of the power NPN transistor, and the base of the lateral PNP transistor is coupled to the driver circuitry.

The boost DC-DC converter circuit operates preferably as follows: during normal boost operation (i.e., when steady-state voltage at the output terminal is higher than voltage at the input terminal), the driver circuitry disables the lateral PNP transistor and drives the power NPN transistor into saturation. Voltage across the inductive storage element is positive during switch ON-time and negative during switch OFF-time. This permits the inductive storage element to establish volt-second balance.

During converter start-up or in step-down mode, the driver circuitry drives the lateral PNP transistor, which in turn drives the power NPN transistor. The power NPN transistor is prevented from saturating, which permits voltage across the composite rectifier to increase while delivering current to the output. The base of the lateral PNP transistor is biased such that voltage across the inductive storage element is negative during switch OFF-time. This permits the inductive storage element to establish volt-second balance, which bounds input current and limits inductive in-rush current.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
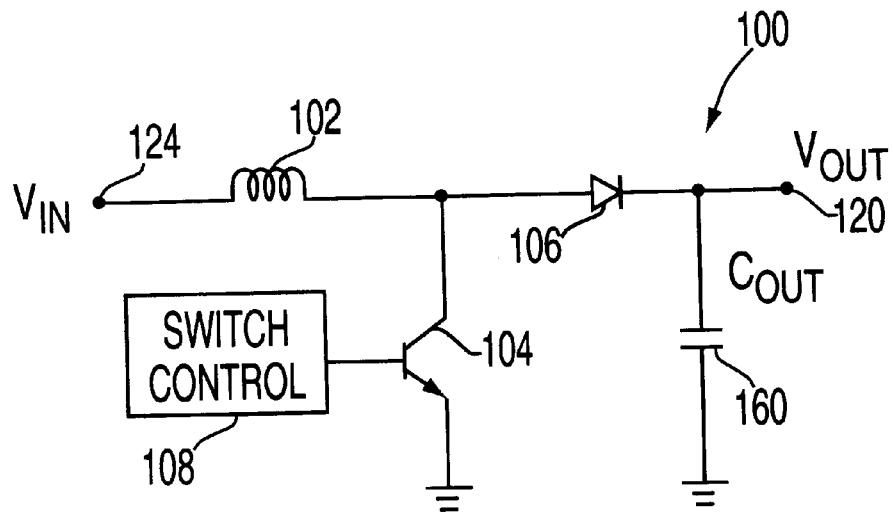
FIG. 1 is a block circuit diagram of a known conventional boost DC-DC converter with a diode rectifier.
Figure 2:
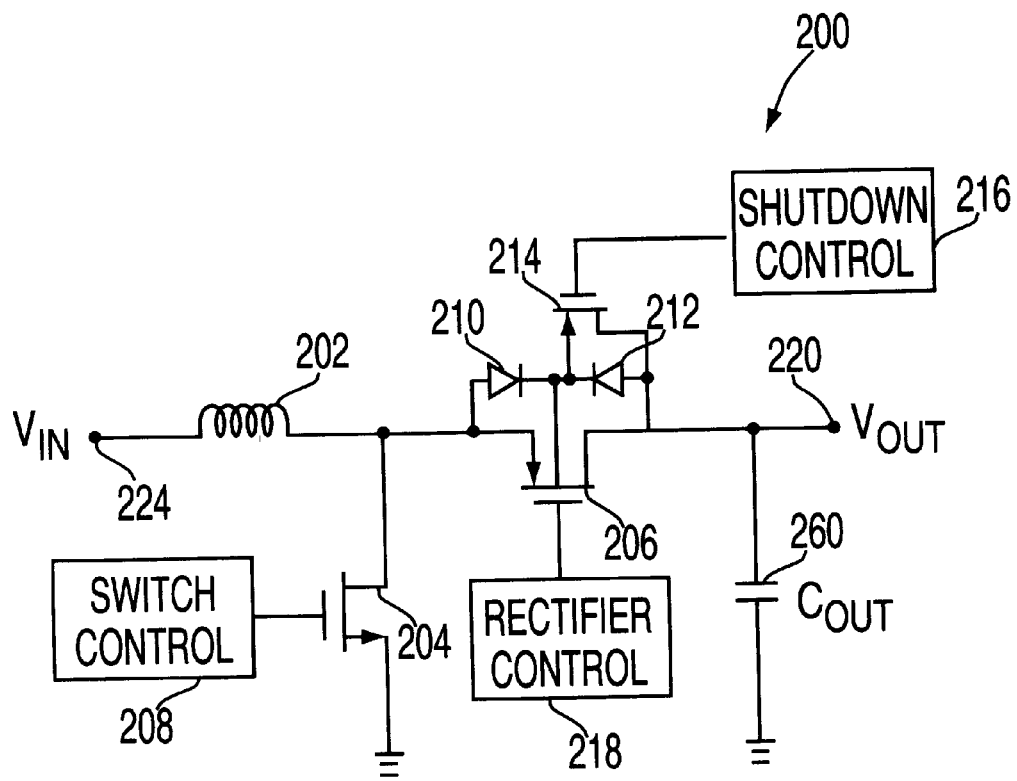
FIG. 2 is a block circuit diagram of a known boost DC-DC converter with a PMOS synchr onous rectifier.
Figure 3:
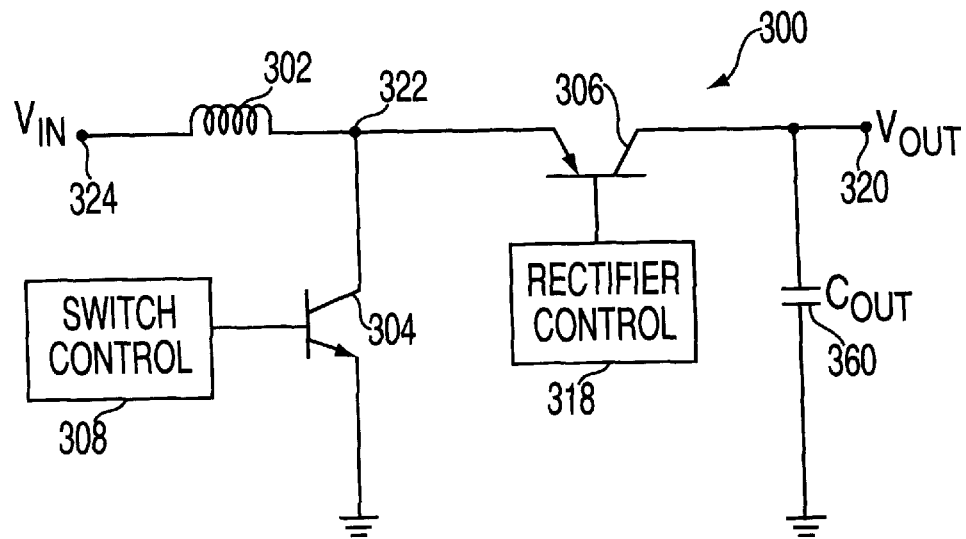
FIG. 3 is a block circuit diagram of a known boost/step-down DC-DC converter with a power PNP synchronous rectifier.
Figure 4:
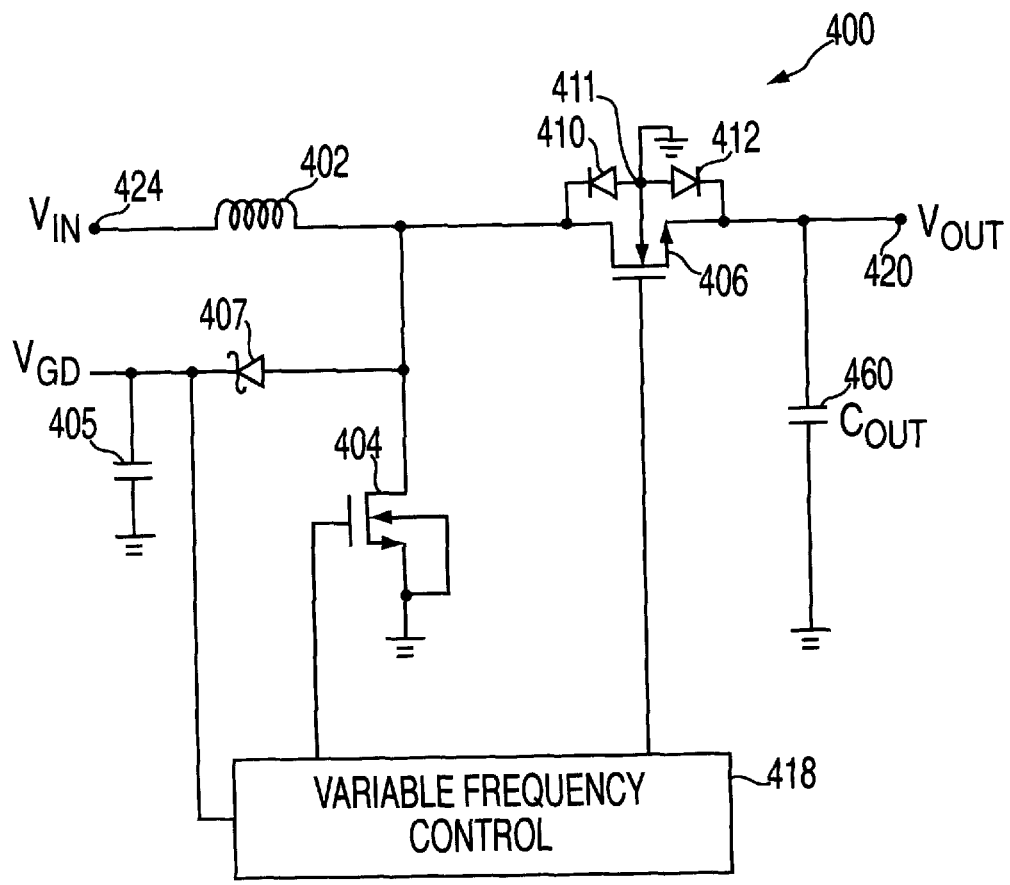
FIG. 4 is a block circuit diagram of a known boost DC-DC converter with an NMOS synchronous rectifier.
Figure 5:
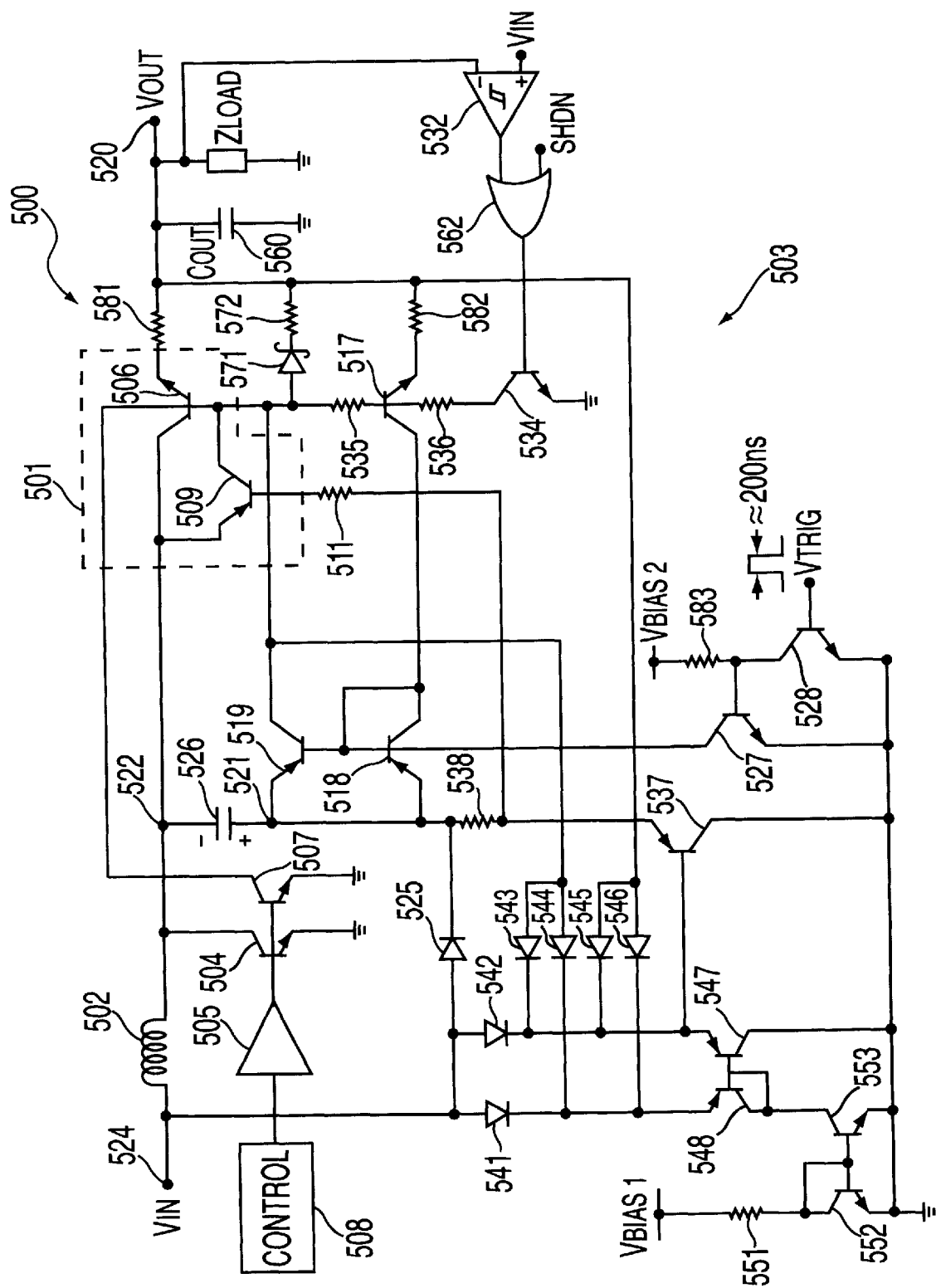
FIG. 5 is a circuit diagram of an exemplary embodiment of a boost DC-DC converter according to the present invention.

An exemplary embodiment of a boost DC-DC converter circuit 500 constructed in accordance with the present invention is shown in FIG. 5. Converter 500 can advantageously be fabricated using conventional bipolar processes, resulting in manufacturing costs generally lower than complementary bipolar or BICMOS processes.

Converter 500 includes composite rectifier 501, which includes power NPN transistor 506 and lateral PNP transistor 509. The polarity of composite rectifier 501 is similar to that of a single PNP transistor with a current gain equal to the product of the current gains of NPN transistor 506 and PNP transistor 509. The current-carrying capability of composite rectifier 501 is essentially that of an NPN transistor with PNP transistor 509 carrying the base current of NPN transistor 506.

Converter 500 also includes inductor 502, main boost converter switch 504, which is driven by buffer 505, feedback control circuitry 508 (known in the art), which controls the duty cycle of switch 504, and driver circuitry 503. Driver circuitry 503 supplies variable base drive to, and controls the voltage across, rectifier 501. Driver circuitry 503 preferably includes SCR (silicon controlled rectifier) driver 517–519; class AB buffer 541–548; emitter follower 537; hysteretic comparator 532; OR gate 562; transistors 507, 527, 528, 534, 552, and 553; capacitor 526; diodes 525 and 571; and resistors 511, 535, 536, 538, 551, 572, 581, 582, and 583.

In normal boost mode ($V_{OUT} > V_{IN}$), PNP transistor 509 is disabled by buffer 541–548 and NPN transistor 506 is driven into saturation by SCR driver 517–519. Inductor voltage is positive during switch 504 ON-time ($V_{L502} \approx V_{IN} > 0$) and negative during switch 504 OFF-time ($V_{L502} \approx V_{IN} - V_{CESAT506} - V_{OUT} < 0$). This bipolar inductor voltage permits inductor 502 to establish volt-second balance (i.e., equilibrium).

SCR driver 517–519 is powered by a voltage higher than $V_{OUT}$. This voltage, $V_{521}$ (at node 521), is generated by a bootstrap circuit that preferably includes diode 525 and capacitor 526. Capacitor 526 is charged through diode 525 during switch 504 ON-time to $$V_{CAP526} = V_{IN} - V_{DIODE525} - V_{CESAT504}$$

Figure 6:
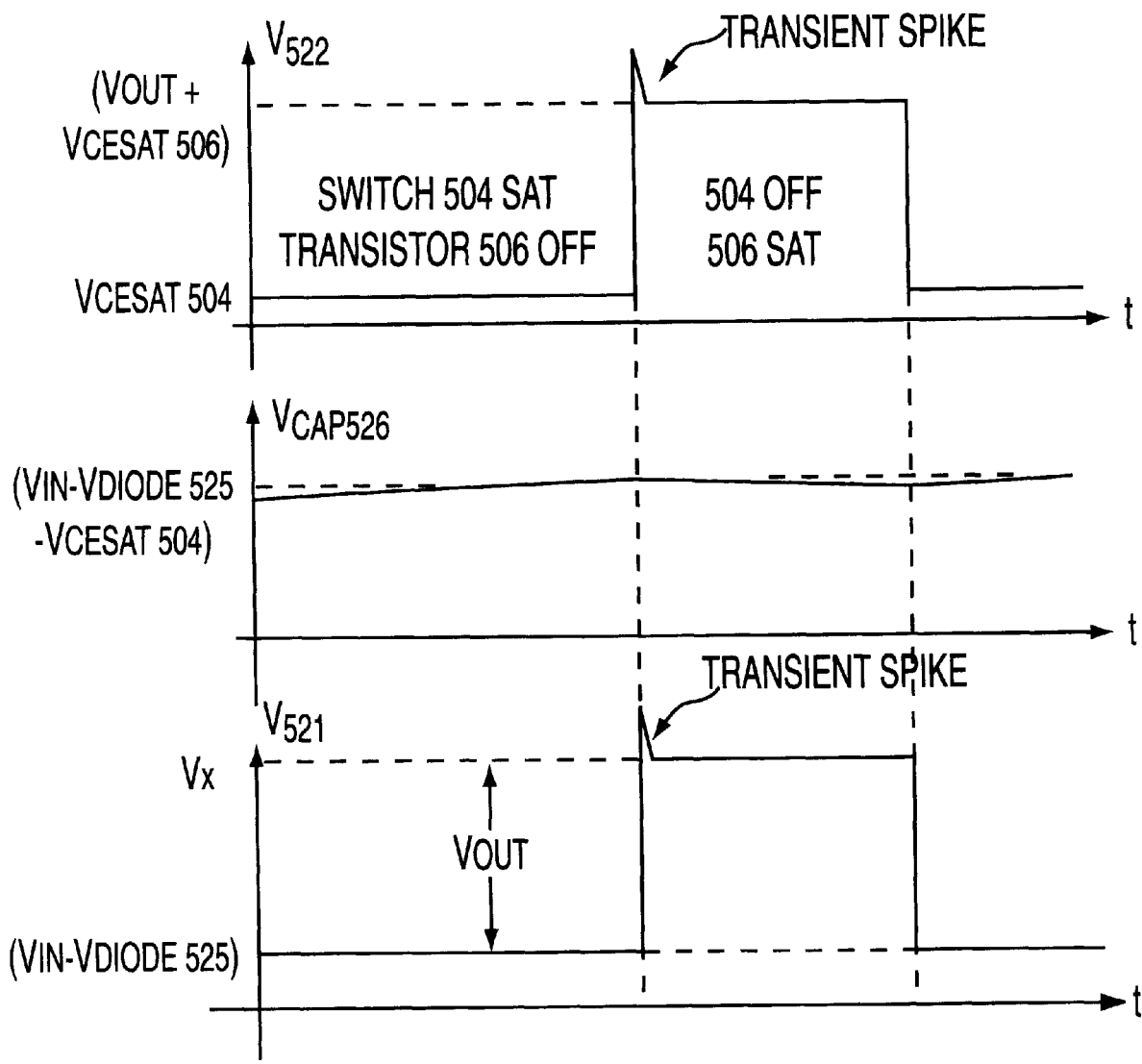
FIG. 6 is a timing diagrams howing the operation of the bootstrap circuit of the converter of FIG. 5 according to the present invention.

When switch 504 is turned OFF, the voltage at node 522 increases to $V_{OUT} + V_{CESAT506}$. This causes $V_{521}$ to increase by a voltage equal to $V_{OUT}$, as shown in FIG. 6. Diode 525 then becomes reverse-biased, and SCR driver 517–519 discharges capacitor 526. The value of capacitor 526 should preferably be chosen to prevent excessive $V_{CAP526}$ ripples. Note that $V_{521}$ is similar to a pulsating voltage supply (see FIG. 6).

Figure 7:
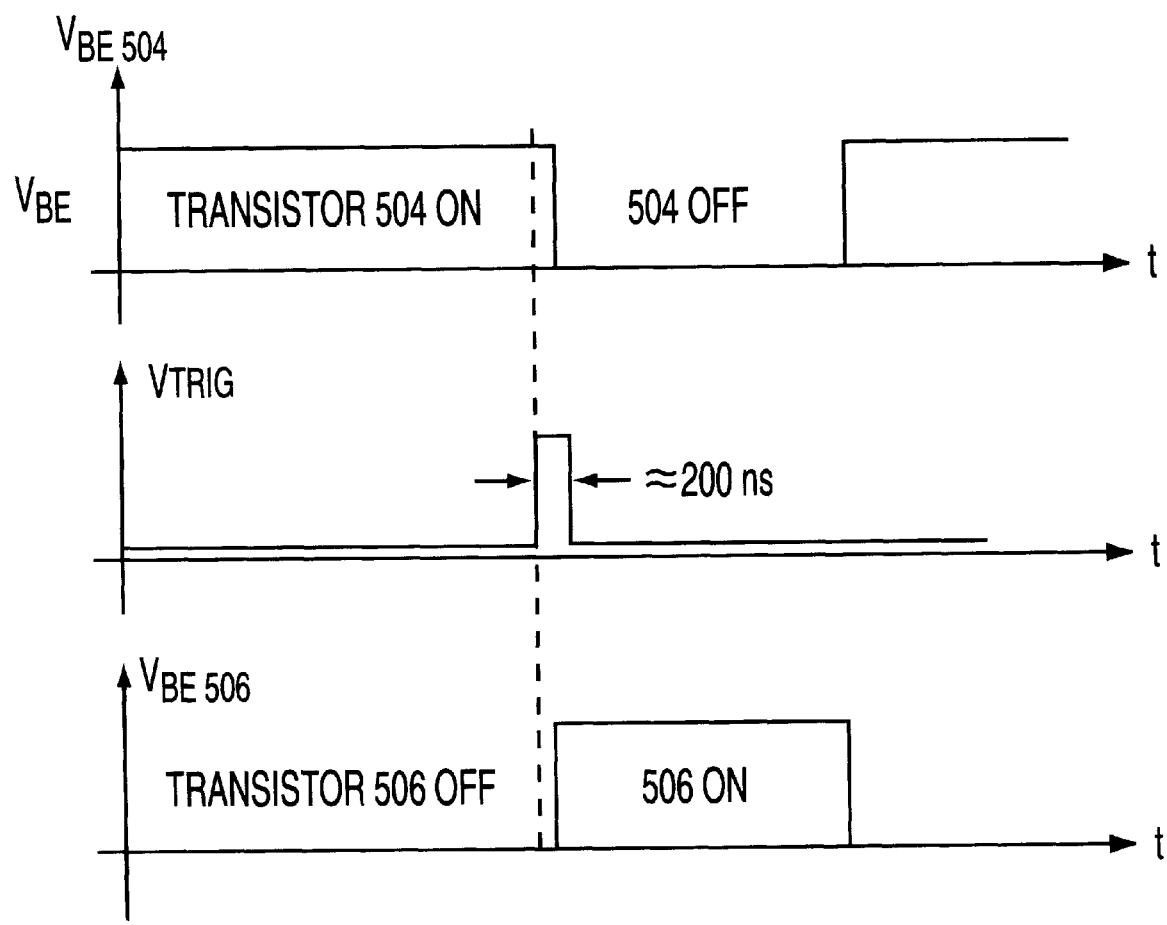
FIG. 7 is a timing diagram of SCR trigger pulse $V_{TRIG}$ of the converter of FIG. 5 according to the present invention.

When switch 504 turns OFF, NPN transistor 506 turns ON. Current from inductor 502 then flows through power NPN transistor 506. Preferably, NPN transistor 506 turns ON immediately after switch 504 turns OFF. To increase the turn-ON speed of NPN transistor 506, trigger circuitry 527,528 turns ON SCR driver 517–519 just as switch 504 is turned OFF. Trigger circuitry 527,528 preferably includes NPN transistors 527 and 528. The relative timings of switch 504 base drive $V_{BASE504}$, trigger pulse $V_{TRIG}$, and NPN transistor 506 base-emitter voltage $V_{BE506}$ are shown in FIG. 7. SCR driver 517–519 turns itself and NPN transistor 506 OFF when inductor current decreases to zero (e.g., when converter 500 enters discontinuous conduction mode, which is where inductor current decreases to zero in each switching cycle). In continuous conduction mode (where inductor current does not decrease to zero), the base charges of NPN transistor 506 and transistor 517 are removed through transistor 507 as switch 504 turns ON.

The ratio[0axb]eq$(n_{506} \, P_{518})/(n_{517} \, P_{519})$ where $n_{506l, \, P518}$, $n_{517}$, and $P_{519}$ are the respective areas of transistors 506, 518, 517, and 519, determines the forced-beta of NPN transistor 506 when it is driven by SCR driver 517–519. To ensure proper transistor saturation, transistors 506, 517, 518, and 519 should preferably be sized such that the above ratio results in a forced beta slightly less than the minimum forward beta of transistor 506 over its operating temperature range.

Figure 8:
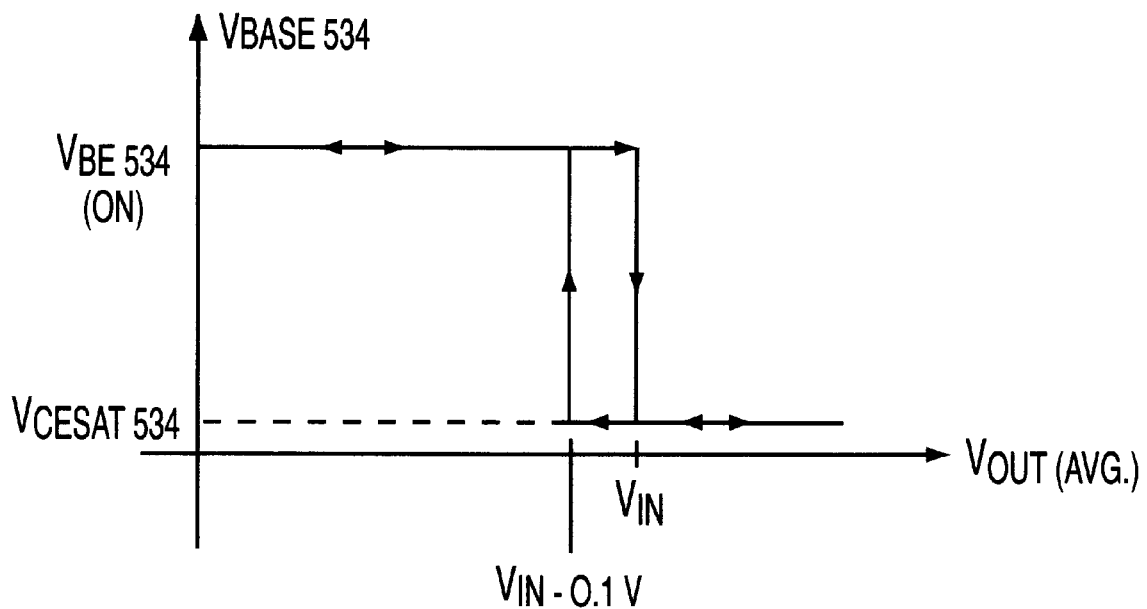
FIG. 8 is a diagram of the DC transfer characteristic of the hysteretic comparator of the converter of FIG. 5 according to the present invention.

Comparator 532 detects the crossover between the filtered output voltage $V_{OUT}$ and the input voltage $V_{IN}$. Comparator 532 filters $V_{OUT}$ to prevent false tripping by output voltage ripples. Output voltage ripples may be caused by the equivalent series resistance of output capacitor 506. Comparator 532 has a hysteresis of about 100 mV, the presence of which substantially eliminates the possibility of oscillating between SCR driver 517–519 driving NPN transistor 506 ($V_{OUT} > V_{IN}$) and PNP transistor 509 driving NPN transistor 506 ($V_{OUT} < V_{IN}$) when $V_{OUT}$ is near $V_{IN}$. The DC transfer characteristic of comparator 532 is shown in FIG. 8.

During converter start-up and at any other time $V_{OUT} < V_{IN}$, comparator 532 turns transistor 534 ON, which draws current through resistors 535 and 536. The voltage drop across resistor 536 turns transistor 517 OFF and deactivates SCR driver 517–519. Lateral PNP transistor 509 then drives NPN transistor 506. The minimum voltage across composite rectifier 501 is $V_{CESAT509} + V_{BE506}$ when PNP transistor 509 saturates. This only occurs during transistor 504 turn-OFF transient. When PNP transistor 509 is not saturated, the composite rectifier voltage drop is determined by the base bias voltage of PNP transistor 509. Under this condition, $V_{CE506} = V_{BASE509} + V_{BE509} - V_{OUT}$ (i.e., $V_{CE506}$ follows the base bias of PNP transistor 509). The voltage across NPN transistor 506 is thus allowed to increase, resulting in negative inductor voltage during switch 504 OFF-time. This permits inductor 502 to establish volt-second balance when $V_{OUT} < V_{IN}$.

Emitter follower 537 and resistor 538 drive PNP transistor 509, and class AB buffer 541–548 drives emitter follower 537. Buffer 541–548 is a maximum value circuit. A maximum value circuit typically receives multiple inputs and then outputs the highest input voltage. The inputs to buffer 541–548 include $V_{IN}$, $V_{OUT}$, and the base voltage of NPN transistor 506. The emitter voltage of emitter follower 537 represents the output of buffer 541–548 and is thus the highest voltage among the inputs to buffer 541–548. Buffer 541–548 prevents the base-collector junction of PNP transistor 509 from turning ON when converter 500 is in boost mode, thus preventing PNP transistor 509 from saturating. Buffer 541–548 is biased by resistor 551 and NPN transistors 552 and 553. When driving PNP transistor 509, emitter follower 537 and buffer 541–548 are a good compromise between performance and circuit complexity.

Resistor 511, which is preferably in the low-value range of about 250–500 ohms, damps the transient response of PNP transistor 509.

When $V_{OUT} < V_{IN}$, PNP transistor 509 and NPN transistor 506 are both active. With the base of PNP transistor 509 biased at about $V_{IN}$ (via the path from $V_{IN}$ through diode 542, emitter follower 537, and resistors 538 and 511), the voltage across inductor 502 is negative and inductor current decreases during switch 504 OFF-time. This allows inductor 502 to establish volt-second balance. Converter 500 can therefore operate as a step-down converter, although the efficiency is less than that of a linear regulator. For example, inductive volt-second during switch 504 OFF-time (when composite rectifier 501 conducts) is $$L_{502} \text{ volt-second} = (1-D) \, (V_{IN} + V_{RS11} + V_{BE509} - V_{IN}) \, (T)$$

where D is the duty cycle of switch 504 (e.g., 50%) and T is the time period of an operational cycle (e.g., several $\mu$secs).

During switch 504 ON-time, inductive volt-second is $$L_{502} \text{ volt-second} = D(V_{IN} - V_{CESAT504}) \, (T)$$

Volt-second balance requires that $L_{502}$ volt-second for switch 504 ON-time equal $L_{502}$ volt-second for switch 504 OFF-time. This results in the following:

$$1 - D = \frac{V_{IN} - V_{CESAT504}}{V_{IN} - V_{CESAT504} + V_{RS11} + V_{BE509}}$$

The efficiency of converter 500 in step-down mode is $$\eta = \frac{\text{output power}}{\text{input power}} = \frac{V_{OUT} I_{OUT}}{V_{IN} I_{IN}} = \frac{V_{OUT}}{V_{IN}} (1-D) \frac{I_{IN}}{I_{IN}}$$

$$= \frac{V_{OUT}}{V_{IN}} (1-D)$$

$$= \frac{(V_{OUT}/V_{IN})}{1 + \frac{V_{RS11} + V_{BE509}}{V_{IN} - V_{CESAT504}}}$$

Note that $V_{OUT}/V_{IN}$ is the efficiency of a linear regulator (where $V_{OUT}/V_{IN} = 1$ is ideal). The efficiency of converter 500 in step-down mode is therefore less than that of a linear regulator by at least a factor of $$1 + \frac{V_{RS11} + V_{BE509}}{V_{IN} - V_{CESAT504}}$$

Composite rectifier 501 advantageously provides converter 500 with a shutdown mode. This mode is initiated when converter 500 receives shutdown signal SHDN at OR gate 562 and at control circuitry 508 (inputs to control circuitry 508 are not shown in FIG. 5 for clarity). Control circuitry 508 responds by turning OFF switch 504, and OR gate 562 responds by turning transistor 534 ON, which disables SCR driver 517–519. PNP transistor 509 and NPN transistor 506 are then both active. Inductor current flows through PNP transistor 509 and NPN transistor 506 to output 520. Because $V_{522} > V_{IN}$ regardless of the input and output voltages, inductor voltage is negative causing magnetic flux to decrease. Accordingly, inductor current decreases to zero, output capacitor 506 discharges through $Z_{LOAD}$, and $V_{OUT}$ decreases to zero. Because the base of PNP transistor 509 is biased at about $V_{IN}$, no current can flow from input 524 to output 520 through inductor 502 and composite rectifier 501. The output is therefore decoupled from the input.

Figure 9:
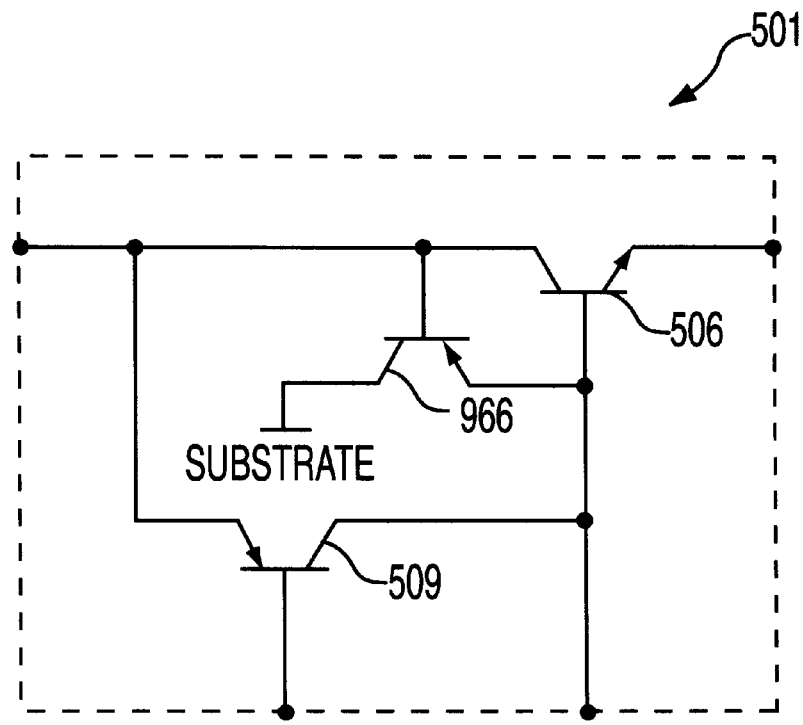
FIG. 9 is a circuit diagram of the composite rectifier of the converter of FIG. 5 according to the present invention.

Diode 571 and resistor 572 comprise a base-emitter bleed circuit for NPN transistor 506 and SCR transistor 517. Diode 571 is preferably a guard-ring Schottky diode with reverse breakdown voltage higher than that of the base-emitter junction of NPN transistor 506. Diode 571 prevents output current from leaking to the substrate through parasitic PNP transistor 966 (shown in FIG. 9) of NPN transistor 506 when either switch 504 is ON or both switch 504 and NPN transistor 506 are OFF and inductor current is zero.

Figure 10:
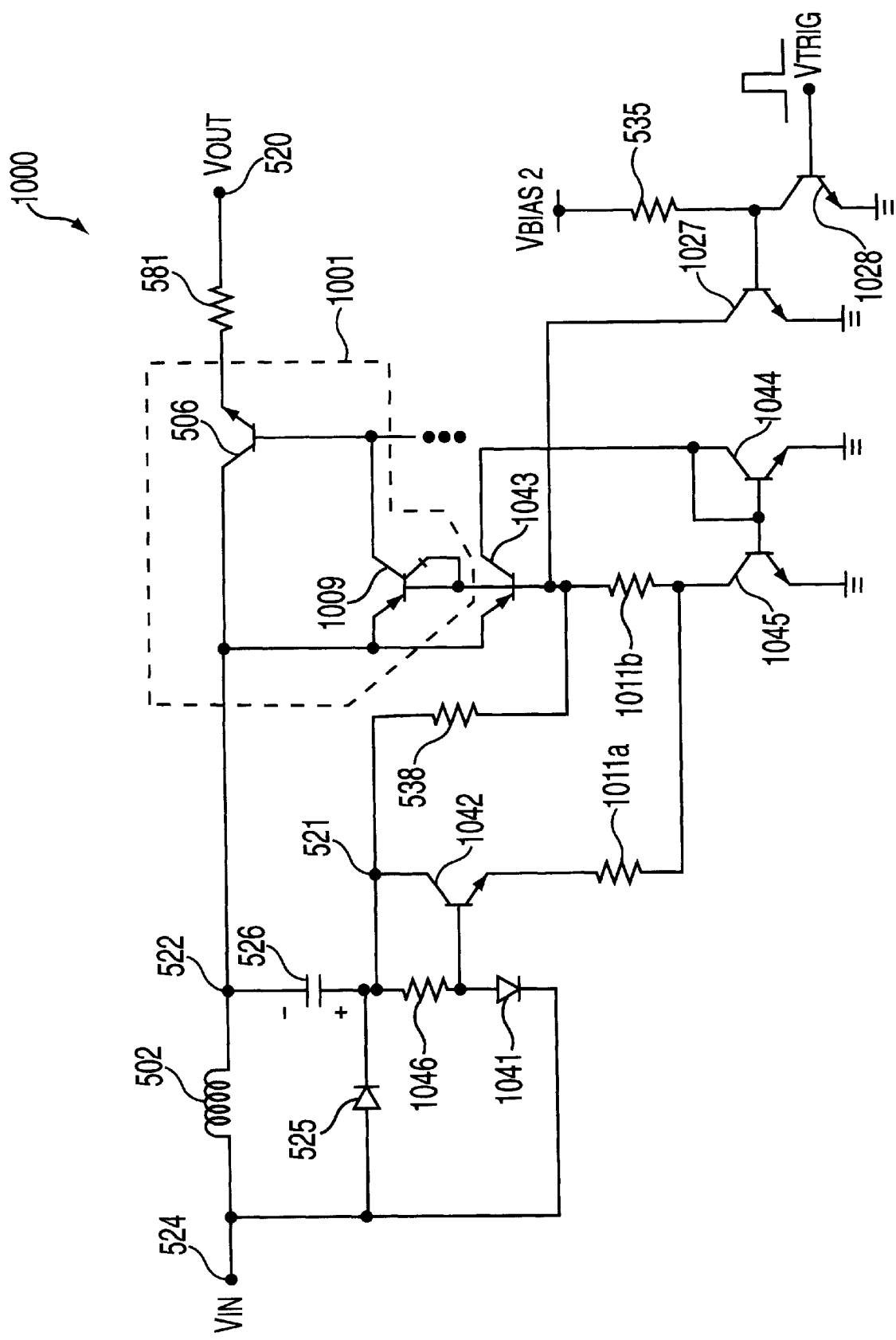
FIG. 10 is a circuit diagram of a second exemplary embodiment of a portion of the converter of FIG. 5 according to the present invention.

FIG. 10 shows a second exemplary embodiment of a portion of converter 500 constructed in accordance with the present invention. Buffer 541–548, emitter follower 537, and resistor 511 of converter 500 are replaced with buffer 1041–1046 and resistors 1011a,b as shown in FIG. 10. Lateral PNP transistor 509 is replaced with lateral PNP transistor 1009. The remaining components of converter 1000 are the same as converter 500 (and are not shown in FIG. 10 for clarity).

PNP transistor 1009 is driven by SCR driver 1043–1045. The collector current of PNP transistor 1009 is sensed with small lateral PNP transistor 1043. The collector current of transistor 1043 is amplified with ratioed current mirror 1044,1045. Resistor 538 is preferably a high-value resistor (e.g., 50k ohms). When transistor 1042 is biased OFF, PNP transistor 1009 is driven with a forced beta of $$(P_{1009} \, n_{104 \, 4})/(P_{104 \, 3} \, n_{104 \, 5})$$

where $P_{1009}$, $n_{104 \, 4}$, $P_{104 \, 3}$, and $n_{104 \, 5}$ are the respective areas of transistors 1009, 1044, 1043, and 1045. These transistors are preferably sized such that the forced beta is less than the minimum forward beta of PNP transistor 1009 over its operating temperature range. PNP transistor 1009 can thus be driven into saturation. This condition occurs when $V_{OUT}$ is about 100–300 mV below $V_{IN}$.

During converter start-up and at any other time $V_{OUT} < V_{IN}$, PNP transistor 1009 operates in the active region. The excess current from transistor 1045 is diverted from PNP transistor 1009 to emitter follower 1042, which drives composite rectifier 1001. With low impedance drive off emitter follower 1042, the transient response of composite rectifier 1001 is damped with two low value resistors 1011a,b, each preferably about 150 ohms. Resistor 1011a partially compensates for the rise in PNP transistor 1009 base voltage caused by the voltage drop across resistor 1011b. Transistors 1027,1028 and resistor 535 comprise a trigger circuit for SCR driver 104 3–1045. This trigger circuit improves the turn-ON transient of composite rectifier 1001.

Figure 11:
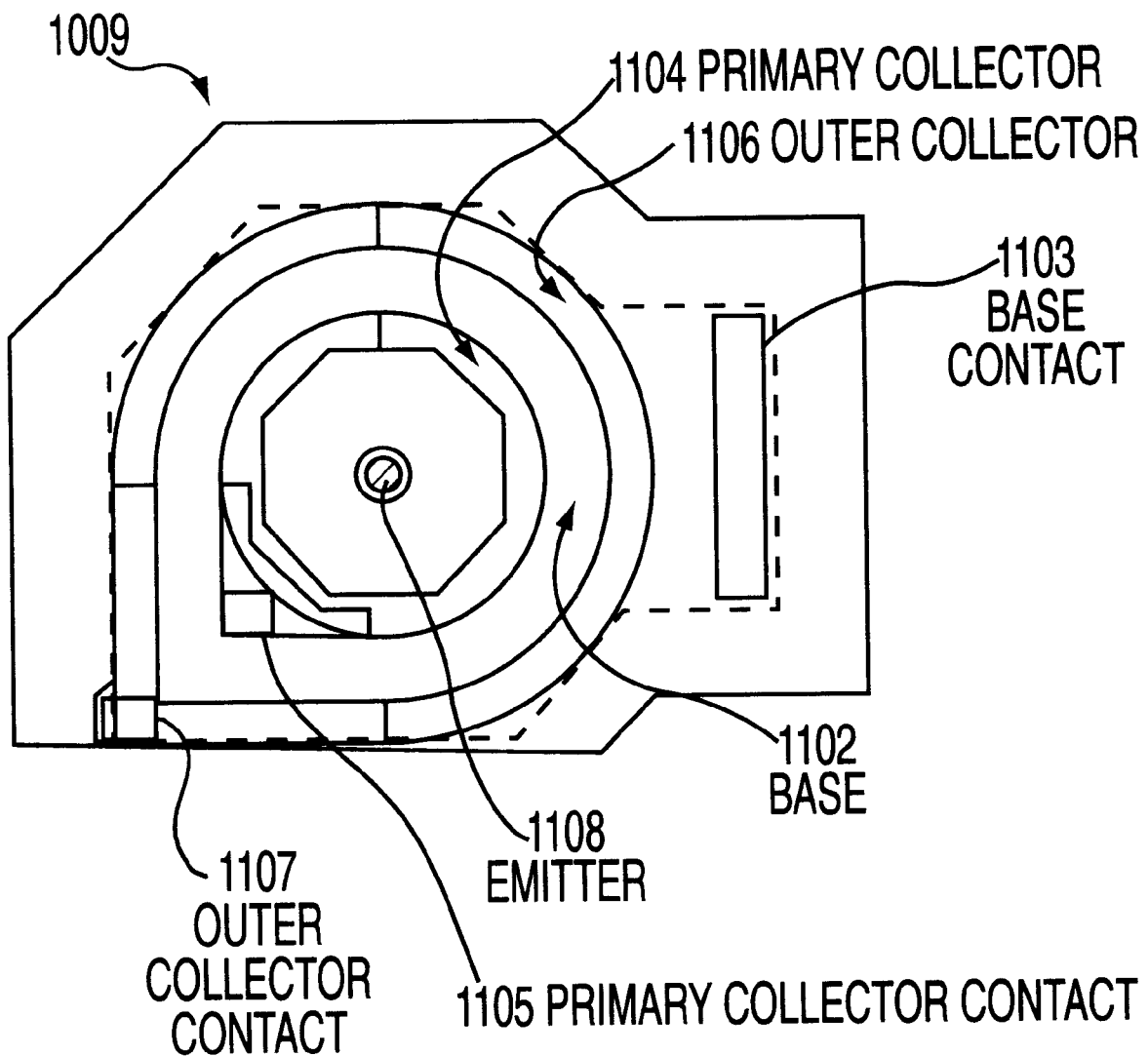
FIG. 11 is an exemplary embodiment of a simplified layout of the lateral PNP transistor of the composite rectifier of the converter of FIG. 10 according to the present invention.

To prevent excessive substrate current, a second collector is preferably constructed outside the primary collector of PNP transistor 1009, as shown in the circuit layout of FIG. 11. During saturation of PNP transistor 1009, minority carriers injected into base 1102 by primary collector 1104 are collected by outer collector 1106, which feeds the minority carriers back to the base bias circuit. This significantly reduces stored charge in base 1102. PNP transistor 1009 can thus be biased on the verge of saturation, improving its transient response while reducing substrate current. Outer collector 1106 advantageously permits composite rectifier 1001 to operate near its minimum voltage drop ($V_{CESAT1009} + V_{BE506}$) without excessive current loss into the substrate as $V_{OUT}$ approaches $V_{IN}$.

Figure 12:
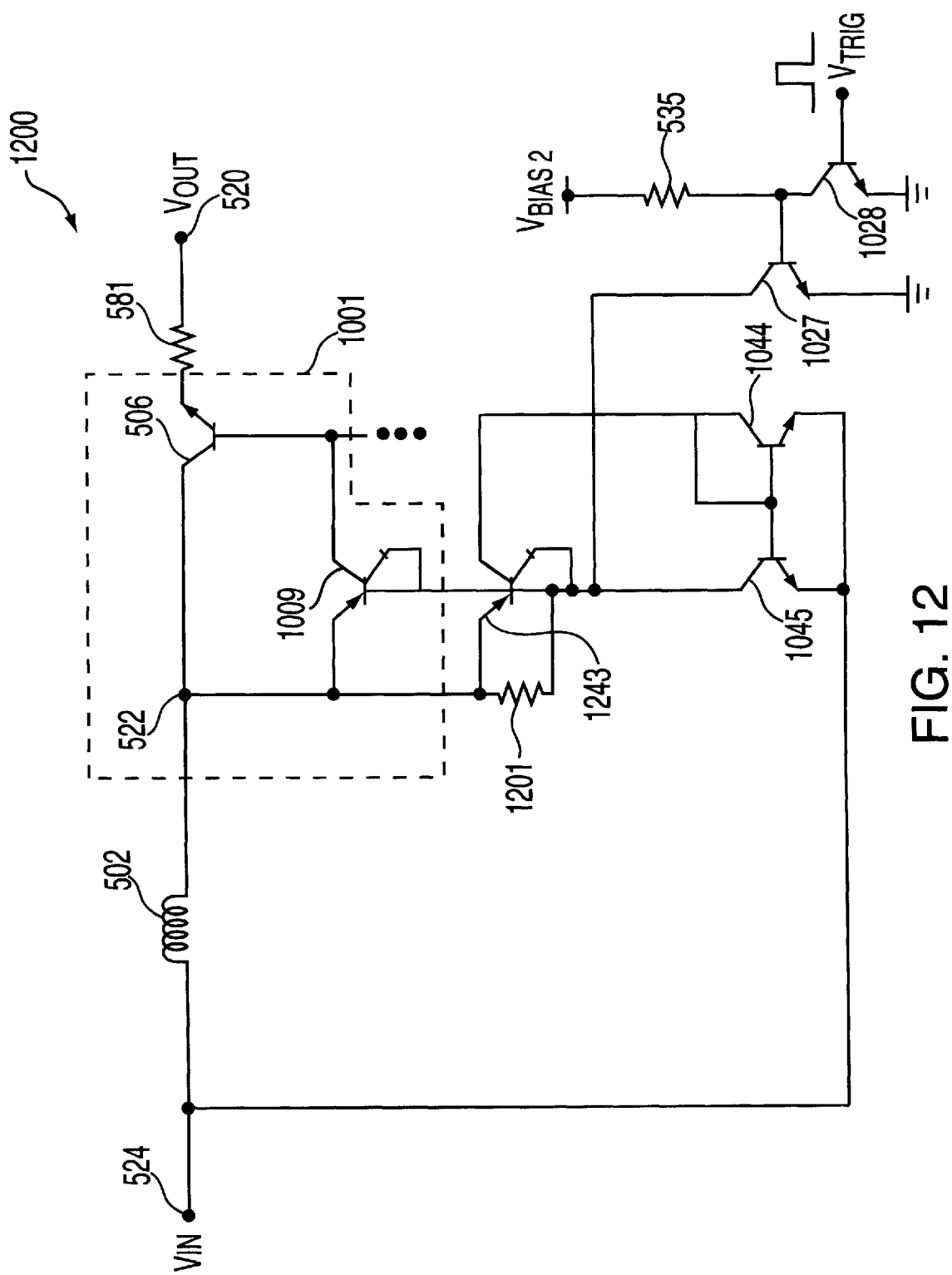
FIG. 12 is a circuit diagram of a third exemplary embodiment of a portion of the converter of FIG. 5 according to the present invention.

A third exemplary embodiment of a portion of converter 500 constructed in accordance with the present invention is shown in FIG. 12. This portion of converter 500 is similar to the portion of converter 500 shown in FIG. 10, except that current mirror 1044,1045 is returned to input node 524 and emitter follower 1042 is eliminated. Resistor 1201 can be tied to node 522 as shown, or alternatively, can be tied to node 521 (not shown in FIG. 12). The remaining components of converter 1200 are the same as converter 500 (and are not shown in FIG. 12 for clarity).

Transistors 1243 and 1045 saturate regardless of the bias condition of PNP transistor 1009. The base voltage of PNP transistor 1009 equals $V_{CESAT104 \, 5} + V_{IN}$. Transistors 1009, 1044, 1243, and 1045 are preferably sized such that the forced beta of transistor 1009, determined by the following ratio of transistor areas, $$(P_{1009} \, n_{104 \, 4})/(P_{1243} \, n_{104 \, 5})$$

is low enough to drive PNP transistor 1009 into saturation. When $V_{OUT}$ is well below $V_{IN}$, and PNP transistor 1009 operates in the forward-active region, SCR driver 1243, 1044,1045, of which transistors 1243 and 1045 are saturating, automatically reduces base drive to PNP transistor 1009. Because composite rectifier 1001 is driven by high-impedance SCR driver 1243,1044,1045, no damping resistor is required. Trigger circuitry 1027,1028 improves the turn-ON transient of SCR driver 1243,1044,1045.

Thus it is seen that boost DC-DC converters with synchronous composite rectifiers are provided that limit inductive in-rush current, include a shutdown mode, operate also in step-down mode, and can be fabricated using conventional bipolar processes. One skilled in the art will appreciate that the present invention can be practiced by other than the described embodiments, which are presented for purposes of illustration and not of limitation, and the present invention is limited only by the claims which follow.

What is claimed is:

1. A boost DC-DC converter circuit comprising:

an input terminal for coupling to a voltage source;

an inductive energy storage element coupled to said input terminal;

a composite rectifier coupled to said inductive storage element, said composite rectifier comprising at least two opposite polarity transistors;

a switch coupled between ground and a node formed between said inductive storage element and said composite rectifier;

control circuitry coupled to said switch;

driver circuitry coupled to said composite rectifier; and an output terminal coupled to said composite rectifier for coupling to a load.

2. The converter circuit of claim 1 wherein said converter circuit is fabricated in a conventional bipolar process.

3. The converter circuit of claim 1 wherein said composite rectifier provides said converter circuit with a shutdown mode.

4. The converter circuit of claim 1 wherein said converter circuit operates in step-down mode.

5. The converter circuit of claim 1 wherein said composite rectifier comprises:

a power NPN transistor having a collector, an emitter, and a base, said collector coupled to said inductive storage element, said emitter coupled to said output terminal, and said base coupled to said driver circuitry; and a lateral PNP transistor having a collector, an emitter, and a base, said emitter of said lateral transistor coupled to said collector of said power transistor, said collector of said lateral transistor coupled to said base of said power transistor, and said base of said lateral transistor coupled to said driver circuitry.

6. The converter circuit of claim 5 wherein said driver circuitry disables said lateral transistor and drives said power transistor into saturation when voltage at said output terminal is higher than voltage at said input terminal.

7. The converter circuit of claim 5 wherein said driver circuitry drives said lateral transistor when voltage at said input terminal is higher than voltage at said output terminal, said lateral transistor driving said power transistor, said power transistor operating outside saturation.

8. The converter circuit of claim 5 wherein said driver circuitry comprises an SCR driver for driving said power transistor.

9. The converter circuit of claim 8 wherein said driver circuitry further comprises a bootstrap circuit for providing said SCR driver with a high voltage.

10. The converter circuit of claim 8 wherein said driver circuitry further comprises trigger circuitry coupled to said SCR driver for receiving a trigger pulse to improve the turn-ON transient of said power transistor.

11. The converter circuit of claim 5 wherein said driver circuitry comprises a maximum value circuit for driving said lateral transistor.

12. The converter circuit of claim 5 wherein said driver circuitry comprises a low-value resistor coupled in series with said base of said lateral transistor for damping a transient response.

13. The converter circuit of claim 5 wherein said lateral transistor has a second collector, said second collector coupled to said base of said lateral transistor.

14. The converter circuit of claim 1 wherein said driver circuitry further comprises hysteretic comparator circuitry for detecting boost or step-down operation, said comparator circuitry having inputs coupled to both said input and output terminals.

15. The converter circuit of claim 14 wherein said comparator circuitry disables said SCR driver when voltage at said input terminal is higher than voltage at said output terminal.

16. A method of limiting inductive in-rush current in a boost DC-DC converter, said converter comprising an output terminal for coupling to a load, an input terminal for coupling to a voltage source, an inductive storage element coupled between said input terminal and said output terminal, a switch coupled between ground and a node formed between said inductive storage element and said output terminal, and control circuitry coupled to said switch, said method comprising:

providing a composite rectifier coupled between said node and said output terminal, said composite rectifier comprising:

a power bipolar transistor, and a lateral bipolar driver transistor coupled to said power transistor, said power and driver transistors being of opposite polarity;

monitoring voltages at said input terminal and said output terminal;

biasing said composite rectifier such that said driver transistor is disabled and said power transistor is saturated when voltage at said output terminal is at least equal to voltage at said input terminal; and biasing said composite rectifier such that said driver transistor drives said power transistor when voltage at said output terminal is less than voltage at said input terminal, said power transistor operating outside saturation such that voltage across said composite rectifier is allowed to vary.

17. The method of claim 16 further comprising biasing said composite rectifier such that said boost DC-DC converter operates in a shutdown mode.

18. The method of claim 17 wherein said boost DC-DC converter is fabricated in a conventional bipolar process.

\* \* \* \* \*

UNITED STATES PATENT AND TRADEMARK OFFICE
CERTIFICATE OF CORRECTION

PATENT NO : 5,994,882
DATED : November 30, 1999
INVENTION : Bing Fong Ma

It is certified that error appears in the above-identified patent and that said Letters Patent are hereby corrected as shown below:

Cover page, second column, second line of OTHER PUBLICATIONS, "date sheet" should be --data sheet--.

Column 1, line 5, "rectifier" should be --rectifiers--;

line 9, "a output" should be --an output--;

line 10, "Convertional" should be --Conventional--;

line 12, "lement" should be --element--;

line 31, "Furt lermore" should be --Furthermore--;

line 36, "belo )" should be --below)--;

line 41, "rectifier 10." should be --rectifier 106.--;

line 44, "VIN" should be --$V_{IN}$--; and line 55, "VOUT" should be --$V_{OUT}$--.

Column 2, line 6, "106" should be --160--; and line 38, "rectifier 20." should be --rectifier 206.--.

Column 3, line 48, "$V_L=V_{IN}>0$" should be --$V_L \approx V_{IN} > 0$--; and line 50, "$V_{322}V_{EB306}$" should be --$V_{322} = V_{EB306}$--.

UNITED STATES PATENT AND TRADEMARK OFFICE
CERTIFICATE OF CORRECTION

PATENT NO : 5,994,882

DATED : November 30, 1999

INVENTION : Bing Fong Ma

It is certified that error appears in the above-identified patent and that said Letters Patent are hereby corrected as shown below:

Column 4, line 14, "404 auxiliary" should be --404, auxiliary--; and line 15, "VGD" should be --$V_{GD}$--.

Column 5, line 50, " trans " should be -- tran- --;

line 51, "istor" should be --sistor--; and line 67, "synchr onous" should be --synchronous--.

Column 6, line 9, "diagrams howing" should be --diagram showing--.

Column 7, line 34, "[0axb]eq($n_{506}$ $P_{518}$)/($n_{517}$ $P_{519}$)" should be --($n_{506}$ $P_{518}$)/($n_{517}$ $P_{519}$)--; and line 35, "$n_{5061}$, $p_{518}$, $n_{517}$, and $P_{519}$" should be --$n_{506}$, $P_{518}$, $n_{517}$, and $p_{519}$--.

Column 9, line 49, "($P_{1009}$ $n_{104\ 4}$)/($P_{104\ 3}$ $n_{104\ 5}$)" should be --($P_{1009}$ $n_{1044}$)/($P_{1043}$ $n_{1045}$)--; and line 50, "$P_{1009}$, $n_{104\ 4}$, $P_{104\ 3}$, and $n_{104\ 5}$" should be --$P_{1009}$, $n_{1044}$, $P_{1043}$, and $n_{1045}$--.

Column 10, line 2, "104 3" should be --1043--;

line 17, "($V_{CESAT1009}$" should be --($\approx V_{CESAT1009}$--;

UNITED STATES PATENT AND TRADEMARK OFFICE
CERTIFICATE OF CORRECTION

PATENT NO : 5,994,882

DATED : November 30, 1999

INVENTION : Bing Fong Ma

It is certified that error appears in the above-identified patent and that said Letters Patent are hereby corrected as shown below:

Column 10, line 31, "$V_{CESAT104\ 5}$" should be --$V_{CESAT1045}$--; and line 37, "$(P_{1009}\ n_{104\ 4})/(P_{1243}\ n_{104\ 5})$" should be --$(P_{1009}\ n_{1044})/(P_{1243}\ n_{1045})$--.

Signed and Sealed this

First Day of May, 2001

Attest:

NICHOLAS P. GODICI

*Attesting Officer*   *Acting Director of the United States Patent and Trademark Office*